United States Patent [19]

Ritzinger

[11] 4,299,129
[45] Nov. 10, 1981

[54] PRESSURE MEASURING DEVICE

[76] Inventor: Klaus Ritzinger, Kettelerstrasse 2, 8033 Planegg, Fed. Rep. of Germany

[21] Appl. No.: 48,162

[22] Filed: Jun. 13, 1979

[30] Foreign Application Priority Data

Jun. 16, 1978 [DE] Fed. Rep. of Germany ....... 2826581

[51] Int. Cl.³ .............................................. G01L 9/02
[52] U.S. Cl. ..................................... 73/746; 73/720; 73/726
[58] Field of Search ................. 73/746, 720, 721, 726, 73/727, 141 A; 338/4, 39

[56] References Cited

U.S. PATENT DOCUMENTS 3,022,672 2/1962 Dimeff et al. ........................ 73/726
3,335,381 8/1967 Di Giovanni ........................ 338/4
3,377,866 4/1968 Flavin ................................. 73/726

FOREIGN PATENT DOCUMENTS 1263351 1/1966 Fed. Rep. of Germany .

Primary Examiner—Donald O. Woodiel
Attorney, Agent, or Firm—Fleit & Jacobson

[57] ABSTRACT

A pressure measuring device for measuring absolute or differential pressure has a hollow carrier, with a deformable measuring bar extending across the opening in the carrier. A transducer is fixed on the bar and converts deformation of the bar to electrical signals. The bar has weakened portions of reduced cross-section at four spaced positions thereon, in order to define the manner of deformation of the bar. A rigid piston connected to the bar substantially centrally thereof is sealingly displaceably guided in a pressure-receiving chamber whereby the piston is subjected to the pressure to be measured and thereby causes deformation of the bar, with the resultant production of electrical signals representing the pressure.

27 Claims, 8 Drawing Figures

PRESSURE MEASURING DEVICE

BACKGROUND OF THE INVENTION

Pressure measuring devices are known, for measuring pressure under various circumstances, in the form of absolute or differential pressures. In many known pressure measuring devices of this kind, the device has a member such as a diaphragm which is deformable by the pressure to be measured. The diaphragm closes a pressure-receiving chamber which is subjected to the pressure to be measured, and tensile or compressive deformation of the diaphragm is converted into electrical signals by strain measuring strips which are arranged on suitable positions on the diaphragm, the signals being sensed by a Wheatstone bridge. As a diaphragm undergoes deformation to a different extent over its entire surface, in the prior art pressure measuring devices, the diaphragm is usually reinforced at its centre by rigid plates fixed thereon. However, the consequence of this is that the part of the diaphragm which is involved in the deformation caused by the pressure force applied thereto and which comprises the resilient annular portion remaining outside the reinforcing plates cannot be precisely defined, and also depends on the degree of diaphragm deflection, that is to say, it depends on the magnitude of the pressure to be measured. This means that the pressure measurement action of many known devices does not have the desired linear nature, quite apart from the fact that its responsiveness, measuring sensitivity and liability to be influenced by various factors such as fluctuations in temperature are often unsatisfactory.

SUMMARY OF THE INVENTION

An object of the invention is to provide a pressure measuring device which does not suffer from the above-indicated disadvantages.

A further object of the invention is to provide a pressure measuring device which provides for a high level of linearity in its output, without being influenced by fluctuations in temperature, dead areas in its pressure-responsive member and other error-producing factors.

Yet another object of the invention is to provide a pressure measuring device which has a rapid response to pressure applied thereto and a high degree of measuring sensitivity.

These and other objects are achieved by a pressure measuring device which comprises a hollow carrier which therefore defines an opening therein or therethrough. A deformable member in the form of a beam or bar extends across the opening, with its two ends secured to the hollow carrier on respective sides of the opening. The bar has weakened or preferential bending portions such as reduced-cross-section portions, at four predetermined positions therealong, between its two ends. The bar is engaged substantially midway of its length by a rigid piston member which is guided sealingly and displaceably in a pressure-receiving chamber whereby pressure to be measured by the device is applied in the chamber to the piston member which accordingly causes deformation of the bar. Mounted on the bar is a strain measuring assembly for detecting deformation of the bar as a result of the piston movement.

The carrier is desirably of a rotationally symmetrical form, such as an annular member, and the reduced-cross-section portions in the bar are advantageously in the form of part-circular recesses which extend over the full width of the beam. The strain measuring assembly preferably comprises strain measuring strips, advantageously arranged at the reduced-cross-section portions of the beam, on both sides thereof.

The arrangement of the invention, with the beam or bar extending across the opening, with clearly defined deformation points formed by the weakened portions, provides that the deformable member which is subjected to the pressure to be measured does not suffer uncontrolled deformation, as in the case of the diaphragm in the prior art devices, but is deformable in a clearly defined manner by being weakened in respect of its resistance to deformation at four predetermined positions, which are preferably arranged symmetrically with respect to the point at which the beam or bar is engaged by the piston member and its positions of clamping in the carrier. The concentration of bending stresses which occur at the predetermined positions on the bar and the notch strain which additionally occurs due to the bending of the bar result in an increased surface strain being produced, thus increasing the measuring sensitivity of the device.

In contrast to the performance which might be expected from a solid bar or beam, the bar of the device according to the invention, with its weakened portions, tends towards a trapezoidal configuration when it is deflected by the pressure to be measured; the portions of the bar between the weakened portions may be considered as being virtually rigid. This means that the stress caused by the pressure force applied to the bar is concentrated at the four weakened portions which thus act virtually as equivalents to hinge points and form the four corners of a trapezium, thus concentrating the strain in the measuring bar at the weakened portions, as indicated above.

In an advantageous embodiment of the invention, strain measuring strips are disposed at at least the two weakened portions which are most closely adjacent to the piston-engagement position, on both sides of the bar. This arrangement provides that two strain measuring strips are subjected to a compressive stress and two of the strips are subjected to a tensile stress, so that this form of bar is to be connected to a fully active Wheatstone bridge arrangement. This form of the device provides an extremely stable and reliable output as the four strips are exposed to virtually equal environmental influences as they are disposed on a surface and close together.

The device is preferably made virtually entirely from a single material such as high-quality steel or aluminium, so that, combined with its preferably completely symmetrical design, there is virtually no possibility of the measuring result being influenced by temperature changes.

In another advantageous embodiment, the device has two pistons which are disposed on respective sides of the measuring bar, and the two pistons are rigidly connected together, to form a rigid unit, including the bar, thereby achieving an extremely high degree of measuring accuracy, in conjunction with an excellent degree of linearity in the measuring result.

These advantages are further increased if a sealing ring which seals the piston in its pressure-receiving chamber serves not only as a seal but also serves to permit displaceability of the piston within the chamber. For this purpose the sealing ring is held at both peripheral edges, that is to say, at the inner peripheral edge in the piston and at the outer peripheral edge in the wall of the pressure-receiving chamber, while between the two edges the sealing ring has a motion zone which is formed by a weakened portion or a recess. This portion of the sealing ring is particularly flexible and elastic, with the piston ring generally being made from a soft flexible material such as silicone rubber, that is to say, a material which has a substantially lower modulus of elasticity than the components which surround the sealing ring, ie the piston and the wall of the pressure-receiving chamber.

With this manner of sealing the piston relative to the pressure-receiving chamber, the force applied to the piston by the pressure to be measured is applied almost completely against the measuring bar, being subject to only the slightest of influences by the highly flexible sealing ring. In addition, as the piston is in the form of a rigid plate member, the piston does not exhibit a measurable change in its effective diameter, even at full deflection, which is usually around 1/10 mm. This arrangement also provides the measuring device according to the invention with an extremely linear output, in regard to measuring accuracy, the variation from linearity being less than 1°/oo. The reproducibility (hysteresis) of the measuring accuracy of the device is 1°/oo and better, which must be considered as an excellent value. Furthermore, the pressure measuring device of the invention provides for a temperature stability of up to 10 ppm/°K., relative to the nominal or rated pressure which serves as a limit value, quite apart from the fact that the over-load capacity of the device may be 200% of the rated pressure, by virtue of the specific construction of the device.

As the rated pressures measuring range can be from 0.1 mbar to 1 bar and more, the pressure measuring device according to the invention may be used to very great advantage in many areas for the measurement of differential and absolute pressures in liquids and gases with minimum dead volumes, that is to say, for example in the flow mechanism for probe direction measurements, eddy or turbulence measurements, in aerodynamics for motor vehicle measurement operations, and wind tunnel measurements, wherein speed measurements of down to below 10 cm/s are possible, in medicine for measurements in regard to blood pressure, breathing pressure and lung volume, in space travel for spacelab experiments, in production methods for pressure system control, limit value transmitters, seal testing devices, leak warning devices, low-pressure remote transmission means, and the like.

DESCRIPTION OF THE PREFERRED EMBODIMENT

Figure 1:
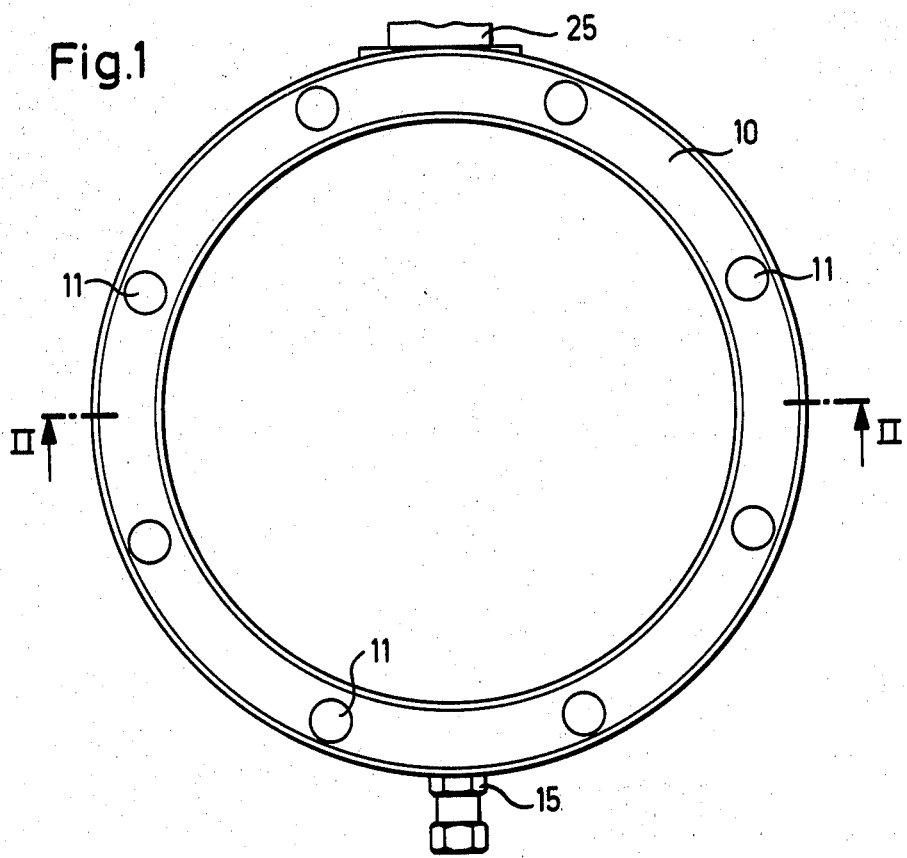
FIG. 1 shows a plan view of one embodiment of the pressure measuring device of the invention.
Figure 2:
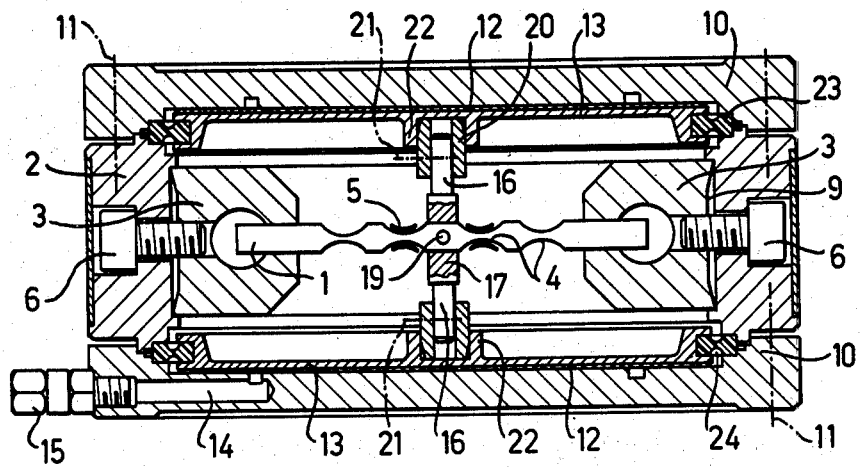
FIG. 2 shows a view in cross-section taken along line II—II in FIG. 1, but also showing a pressure connection to the device.
Figure 3:
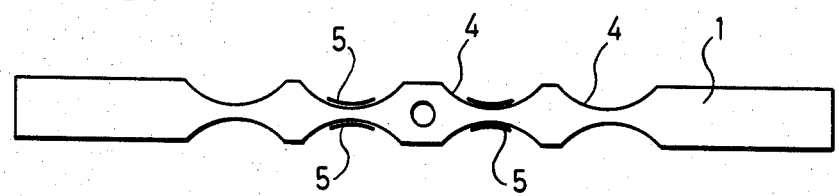
FIG. 3 shows a side view of the measuring beam or bar, on an enlarged scale.
Figure 4:
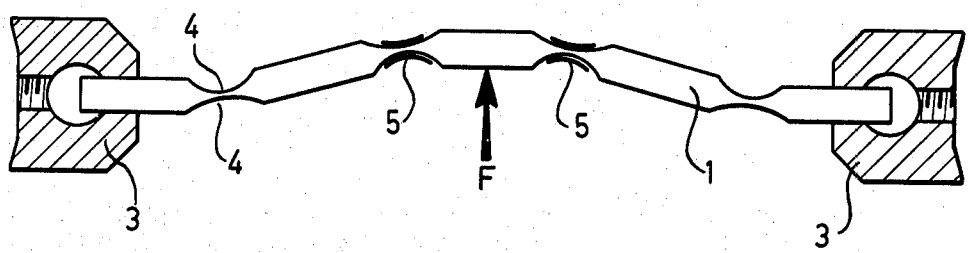
FIG. 4 shows a diagrammatic side view of the trapezoidal bending configuration formed by the deformed measuring beam or bar of FIG. 3.
Figure 6:
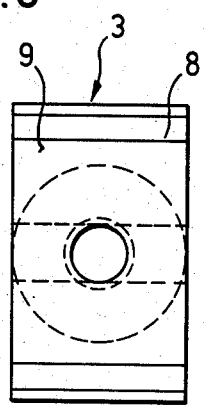
FIG. 6 shows a rear view of the FIG. 5 clamp.

Reference will now be made to the drawing and more particularly FIGS. 1 and 2, showing a pressure measuring device for the mechanical-electrical measurement of absolute or differential pressures in liquids or gases. This device has a member which is deformable by virtue of the pressure to be measured, in the form of an elongate measuring beam or bar 1, referred to hereinafter in this description as the bar, for simplicity. The bar 1 extends across an opening in a hollow carrier 2, and both ends of the bar are gripped in respective clamps 3 held in the carrier, on opposite sides of the opening. The bar 1 can be loaded at its centre in a manner to be described hereinafter, and can accordingly be deflected. For this purpose, in order to provide for clearly defined deflection movement of the bar 1, weakened portions 4 formed by reductions in the cross-section of the bar are provided in the bar 1 at four predetermined positions, intermediate the ends of the bar, to form preferential bending positions for the bar 1. The portions 4 are arranged symmetrically both with respect to the centre point of the bar and also with respect to the two clamping positions at the respective ends of the bar, so that the portions 4 form four hinge positions in the bar 1 and thereby permit the bar 1 to be deflected, under the action of a pressure force F (FIG. 4), into a generally trapezoidal configuration, in the manner shown in FIG. 4. The respective portions of the bar 1 which remain between the weakened portions 4 and which are therefore of the full original cross-section of the bar, remain virtually rigid.

The portions 4 are formed by recesses which are of a part-circular cross-sectional configuration and which each extend over the full width of each face of the measuring bar, symmetrically with respect to a plane through the bar 1 lengthwise thereof.

The bar 1 carries measuring means in the form of strain measuring strips 5 which are disposed at weakened portions 4, on both faces of the measuring bar 1. In the embodiment shown, as can be seen from FIGS. 2 and 4, strain measuring strips 5 are provided only at those weakened portions 4 which are most closely adjacent the centre of the bar 1.

Figure 5:
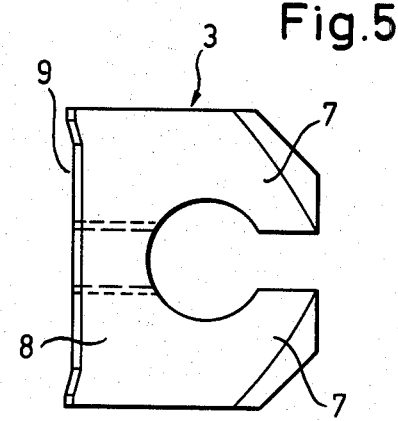
FIG. 5 shows a side view of one of the clamps used for gripping the measuring beam or bar at its two ends.

As already mentioned hereinbefore, the two ends of the bar 1 are gripped in clamps 3 which are fixed in the hollow carrier 2 on respective sides of the opening therein, and are secured to the carrier 2 by way of cylindrical screws 6 which also serve as tensioning screw means. Each of the two clamps 3 has the cross-sectional configuration of a U-shape (see FIG. 5), with the two limb portions 7 of the U-shape clamping the associated end of the bar 1 therebetween, while the transverse bottom portion 8 of the U-shape is provided for fixing the clamp 3 to the carrier 2. For this purpose, on its transverse portion 8, each clamp 3 has a generally concave surface 9 whose edge bears against the inside peripheral surface of the annular carrier 2, so that, when the clamp 3 is secured to the carrier 2 by the screws 6 which pass radially through the carrier 2 from the outside and which engage into a screw-threaded bore in the clamp 3, the clamp 3 is both tightened against the carrier 2 and also displaced into its clamping condition in which its two limb portions 7 grip therebetween the associated end of the bar 1. It will be readily appreciated that when the screw 6 is tightened, the curvature of the concave clamping surface 9 is reduced so that the limb portions 7 of the clamp 3 are urged towards each other at their free ends in order to clamp the bar 1.

As can be seen in particular from FIGS. 1 and 2, the carrier 2 is of an annular configuration, with the clamps 3 for clamping the two ends of the bar 1 being held to the inside peripheral surface of the carrier 2, at diametrically opposite positions, by means of the screws 6. The hollow interior or opening of the body of the annular carrier 2 is closed at the top and at the bottom (in FIG. 2) by respective cover members 10 which bear against the axially facing end surfaces of the annular carrier body 2. The cover members 10 are secured by means of cylindrical screws 11 which are arranged at uniform spacings from each other, around the periphery of the annular configuration. Each cover member 10 provides or defines a pressure-receiving chamber 12 for receiving the pressure to be measured, with a piston or pressure plate 13 displaceable in each chamber 12.

Each chamber 12 is connected by way of a suitable radially extending bore 14 to a pressure connection 15 which comes out of the side of the annular carrier 2, as can also be seen from FIG. 1. The connection 15 is shown in FIG. 2 as being turned through 90° on the carrier 2 from its position in FIG. 1, in order to be visible in the sectional view. The arrangement is such that the two pressure connections 15 for the upper and lower chambers 12 (as viewed in FIG. 2) are disposed precisely one above the other, that is to say, in the plane which includes the longitudinal centre axis of the pressure measuring device (the upper pressure connection 15 is not shown in FIG. 2 but will be disposed above the lower connection 15 which is in fact shown).

As can also be seen from FIG. 2, each chamber 12 is substantially less in height than its diameter, so that the dead space or volume and the liability of being influenced by temperature fluctuations in particular, are reduced to an absolute minimum, and the pressure measuring device has a very rapid response to pressure or pressure changes.

Figure 8:
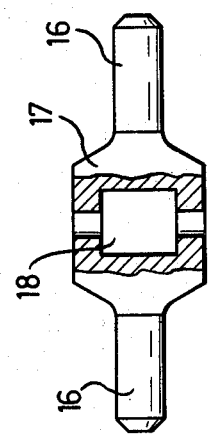
FIG. 8 shows a front view of the holding member which engages around the measuring beam or bar, with two connecting pins for two piston members.

The piston 13 displaceably disposed in the respective chamber 12 is in the form of a rigid plate, being of large diameter in relation to its length. The pistons 13 which are disposed in the respective upper and lower chambers 12 as shown in FIG. 1, that is to say, above and below the bar 1, are each connected to the bar 1, thereby to form a rigid unit therewith. For this purpose, each rigid piston 13 is connected to the bar 1 by means of a pin or projection 16. The two pins 16 are integrally connected to a bracket or holding member 17 as shown in FIG. 8, with the holding member 17 embracing around the measuring bar 1 by means of a central opening 18 in the holding member 17, the bar 1 passing through the opening 18. The bar 1 is connected to the holding member 17 by means of a clamping pin 19 (shown in FIG. 2) which passes through bores (not referenced but shown in FIG. 8) in the holding member 17. At their free end, each of the two pins 16 which project away from the main body portion of the holding member 17 engages into a bush or sleeve 20 and are secured therein as by means of a screw-threaded pin 21. Each sleeve 20 in turn engages into and is fixedly connected in a socket 22 provided centrally on the respective piston 13 whereby the two pistons 13 are rigidly connected to the bar 1 so as to form a rigid unit therewith.

Figure 7:
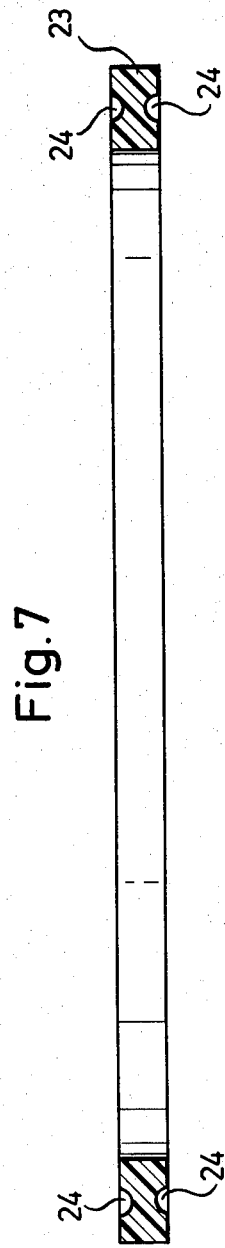
FIG. 7 shows a view of the sealing ring for sealing the piston, in cross-section.

Each piston 13 which is displaceably guided in its associated chamber 12, is sealed with respect to the wall thereof, by a sealing ring 23 which is of the configuration shown in FIG. 7. The radially inward edge or inner peripheral edge of the sealing ring 23 is gripped in a suitable annular groove in the piston 13 and is secured therein, while the radially outer edge or outer peripheral edge of the sealing ring 23 is gripped between the respective cover member 10 and the body of the annular carrier 2. This arrangement ensures that the piston 13 is completely sealed with respect to the annular wall of the chamber 12. In order to permit the piston 13 to be displaced in the precisely defined manner, as required for proper operation of the device, in its free region which is between its radially inward and radially outward edges, the sealing ring 23 has a motion zone 24 which is formed by weakening the sealing ring 23 by a reduction in its cross-section or recessing in both faces of the sealing ring 23. The flexible region therefore permits free movement of the piston 13 in the chamber 12. In order further to allow such movement, the sealing ring 23 also comprises a material, such as preferably silicone rubber, which is of a substantially lower modulus of elasticity than the material of the components which define the chamber 12, that is to say, essentially the piston 13 and the cover member 10 including the annular body of the carrier 2. Tests have shown that, in spite of the weakened region 24 in the sealing ring 23, the sealing ring 23 has an extremely long service life, which may be for example five years or more. At any event, this configuration ensures that the movement of the piston 13 causes movement of the sealing ring 23 only at a precisely determined position, namely the region 24, while also ensuring that the piston 13 is perfectly sealed with respect to the wall of the chamber 12.

All the components of the above-described device, except for the screws 6, the sealing ring 23 and the strain measuring strips 5 in the embodiment illustrated, are made from the same material eg aluminium and are so arranged or designed that the pressure measuring device is symmetrical as far as possible in every direction, that is to say, both with respect to its longitudinal central plane and also its transverse central plane. This arrangement at least minimises and may even totally exclude all undesired external influences such as fluctuations in temperature.

Finally, as may be seen from FIG. 1, the pressure measuring device has at one side, opposite the pressure connection 15, a plug connection 25 for connecting the signal lines of the strain measuring strips 5 and the electronic unit employed in association with the device. Furthermore, in order to reduce the weight of the carrier 2 or for mounting electronic signal-processing means such as amplifiers, digital display means, current supply batteries and the like, the annular carrier 2 has segment-like recesses in its wall.

The above-described device operates in the following manner:

When an absolute or differential pressure is applied to the device, with pressure being applied in one or in both chambers 12, by way of the respective connection or connections 15, the respective piston 13 to which the pressure is applied is uniformly displaced towards the measuring bar 1, with the region 24 of the sealing ring 23 being suitably deformed when this occurs. As the piston 13 is rigidly connected to the centre of the bar 1 by way of the pin 16 and the holding member 17, the bar 1 is deflected by the force F (FIG. 4) which is applied thereto and is deformed for example into the generally trapezoidal configuration shown in FIG. 4 (it will be appreciated that the trapezoidal configuration is shown in an exaggerated form in FIG. 4 in order to enhance appreciation of this configuration). When the bar 1 is deformed in this way, the portions thereof which are disposed between the weakened portions 4 remain substantially rigid, while the weakened portions 4 permit closely defined deflection movement of the bar 1, acting virtually as hinges or pivots. The notch and bending stresses which occur at the weakened portions 4 in the bar 1 when the bar 1 is deformed in this way subject the strain measuring strips 5 to a tensile and/or compressive loading, thereby producing a signal which can be sensed in the usual manner, for example by means of a Wheatstone bridge connected to the above-mentioned connection 25 in FIG. 1.

Various modifications and alterations may be made in the above-described embodiment which is given merely by way of example, without thereby departing from the spirit and scope of the present invention.

I claim:

1. A pressure measuring device for the mechanical-electrical measurement of pressures, in which the deformation of a beam that is deformable by the pressure to be measured is picked off as an electrical signal by signal measuring means, and in which the deformable beam which supports the signal measuring means is fixed by its ends in a hollow support and centrally connected with at least one part admitting a compressive force to be measured, the pressure measuring device comprising a deformable beam consisting of one single measurement beam (1); a carrier ring (2) having clamping means (3,6) for clamping both ends of the beam, said carrier ring and clamping means (3,6) being arranged symmetrically to a longitudinal center plane of said beam, the measuring beam (1) having rigid portions separated by weakened portions (4) at four predetermined sites therealong between its ends for a defined deflection in the form of a trapezoidal deflection curve, said weakened portions extending in an arrangement that is symmetrical in respect to the center of the beam as well as to the clamping sites of the beam, over the full width of the measuring beam (1); signal measuring means comprising expansion-measuring strips (5) secured in said weakened portions; and a part admitting compressive force connected centrally and rigidly with the measuring beam (1), the part, in turn, being designed as a rigid piston (13) mounted tightly and movably in a pressure-receiving chamber (12).

2. A pressure measuring device in accordance with claim 1, characterized by the fact that the weakened portions (4) are arranged on both sides of the measuring beam (1) facing each other.

3. A pressure measuring device in accordance with claim 1 or 2, characterized by the fact that the weakened portions (4) of the measuring beam (1) are formed as recesses of part-circular cross-section.

4. A pressure measuring device in accordance with claim 3 or 2, characterized by the fact that the extension-measuring strips (5) are arranged on both sides of the measuring beam (1).

5. A pressure measuring device in accordance with claim 3 or 2, characterized by the fact that the device is rotationally symmetric and symmetric in respect to the longitudinal center plane of the measuring beam, which is perpendicular to the rotation-symmetry axis.

6. A pressure measuring device in accordance with claim 3 or 2, characterized by the fact that the two ends of the measuring beam (1) are secured in clamps (3) of the clamping means which, in turn, are fixed on the carrier ring and are stressed with respect to it.

7. A pressure measuring device in accordance with claim 6, characterized by the fact that the cross-section of each clamp (3) has the form of a U-profile having limbs interconnected by a transverse base portion, said limbs (7) clamping the associate end of the measuring beam (1) between themselves, and the transverse base portion (6) being secured to the carrier ring (2).

8. A pressure measuring device in accordance with claim 6, characterized by the fact that the carrier ring (2) has an inward peripheral surface that secures, diametrically opposed to one another, the stressed ends of the measuring beam (1), and that the wall of the carrier ring (2) has segment-like recesses so as to reduce material.

9. A pressure measuring device in accordance with claim 1 or 2, characterized by the fact that each clamp (3) of the clamping means has a transverse base portion (8) having outwardly a concave surface with an edge lying against the inward peripheral surface of the carrier ring (2), and that each clamp has been secured to the carrier ring (2), as well as caused to be in a clamping state, by means of a tightening screw (6) that extends through the carrier ring (2) from the outside.

10. A pressure measuring device in accordance with claim 1 or 2, characterized by the fact that the carrier ring (2) has an inner space closed by a cover which rests on its peripheral edge and is secured to it, and in which the pressure-receiving chamber (12) with the movable pistion (13) has been arranged.

11. A pressure measuring device in accordance with claim 10, characterized by the fact that the piston (13) is secured in the pressure-receiving chamber (12) by means of a sealing ring (23) having inner and outer ends respectively fixed in the piston (13) and in one of the cover (10) and carrier ring (2), the ring, in the free area between its ends, which are fixed on both sides, having a motion region (24) formed by means of a cut and allowing the piston (13) to move within the pressure receiving chamber (12).

12. A pressure measuring device in accordance with claim 11, characterized by the fact that the sealing ring (23) is made of a material, preferably of silicone rubber, that has a substantially lower modulus of elasticity than the material of the cover and piston defining the pressure-receiving chamber (12).

13. A pressure measuring device in accordance with claim 1 or 2, characterized by the fact that the piston has been designed as a rigid pressure plate (13) which is braced on a pin (16) connected to the piston (13) centrally thereof.

14. A pressure measuring device in accordance with claim 13, characterized by the fact that the pin (16) is connected with the measuring beam (1) by way of a bracket (17) extending around it.

15. A pressure measuring device in accordance with claim 1 or 2, characterized by the fact that the device has two pistons (13) that are arranged on both sides of the measuring beam (1) and are joined with the measuring beam (1) so as to form one rigid unit.

16. A pressure measuring device in accordance with claim 1 or 2, characterized by the fact that substantially all components thereof are made of the same material.

17. A pressure measuring device in accordance with claim 1 or 2, characterized by the fact that the pressure-receiving chamber (12) is substantially less in height than in diameter and has a pressure connection (15) which extends laterally in an outward direction.

18. A pressure measuring device for the mechanical-electrical measurement of pressure, comprising: a carrier means defining an opening therein, the carrier means providing a pressure-receiving chamber adapted to receive a pressure to be measured; a one piece deformable bar having first and second ends detachably secured to the carrier means and extending across said opening in the carrier means, the bar having weakened portions at a plurality of spaced positions therealong intermediate its ends, for a definite deformation of the bar of predetermined shape, said weakened portions each extending over the full width of the bar; clamping means stressed with respect to and secured to said carrier means for clamping first and second ends of said bar across said opening, said clamping means comprising two clamping members, each having a generally U-shaped cross-section defining first and second substantially parallel limb portions between which an associated end of said bar is clamped, and a transverse base portion secured to said carrier means; strain gage means disposed on said weakened portions on the bar, operable to convert deformation of the bar to an electrical signal; a rigid piston means sealingly displaceable in the pressure-receiving chamber and engaging the bar substantially centrally thereof; and means for conducting a said pressure to said chamber whereby a pressure applied to the piston in said chamber causes deformation of the bar in a clearly defined manner.

19. A pressure measuring device for the mechanical-electrical measurement of pressure, comprising: a carrier means defining an opening therein, the carrier means providing a pressure-receiving chamber adapted to receive a pressure to be measured; a one piece deformable bar having first and second ends detachably secured to the carrier means and extending across said opening in the carrier means, the bar having weakened portions at a plurality of spaced positions therealong intermediate its ends, for a definite deformation of the bar of predetermined shape, said weakened portions each extending over the full width of the bar; strain gage means disposed on said weakened portions on the bar, operable to convert deformation of the bar to an electrical signal; a rigid piston means sealingly displaceable in the pressure-receiving chamber and engaging the bar substantially centrally thereof; and means for conducting a said pressure to said chamber whereby a pressure applied to the piston in said chamber causes deformation of the bar in a clearly defined manner, said carrier means being of an annular configuration having segment-like recesses in its wall, and said first and second ends of said bar being secured to respective inward peripheral surface portions of said annular configuration, diametrically opposite each other.

20. A pressure measuring device for the mechanical-electrical measurement of pressure, comprising: a carrier means defining an opening therein, the carrier means providing a pressure-receiving chamber adapted to receive a pressure to be measured; a one piece deformable bar having first and second ends detachably secured to the carrier means and extending across said opening in the carrier means, the bar having weakened portions at a plurality of spaced positions therealong intermediate its ends, for a definite deformation of the bar of predetermined shape, said weakened portions each extending over the full width of the bar; clamping means secured to said carrier means for clamping first and second ends of said bar; strain gage means disposed on said weakened portions on the bar, operable to convert deformation of the bar to an electrical signal; a rigid piston means sealingly displaceable in the pressure-receiving chamber and engaging the bar substantially centrally thereof; means for conducting a said pressure to said chamber whereby a pressure applied to the piston in said chamber causes deformation of the bar in a clearly defined manner, said carrier means being annular, said clamping means comprising two members, each having a generally concave radially outward surface configuration, which thereby lies against the inward peripheral surface of the carrier means; and a screw extending through said carrier means in a radially inward direction that screws into said clamping means thereby to secure said clamping means to said carrier means and also to cause said clamping means to clamp the respective end of said bar.

21. A pressure measuring device for the mechanical-electrical measurement of pressure, comprising: a carrier means defining an opening therein, the carrier means providing a pressure-receiving chamber adapted to receive a pressure to be measured; a one piece deformable bar having first and second ends detachably secured to the carrier means and extending across said opening in the carrier means, the bar having weakened portions at a plurality of spaced positions therealong intermediate its ends, for a definite deformation of the bar of predetermined shape, said weakened portions each extending over the full width of the bar; strain gage means disposed on said weakened portions on the bar, operable to convert deformation of the bar to an electrical signal; a rigid piston means sealingly displaceable in the pressure-receiving chamber and engaging the bar substantially centrally thereof; means for conducting a said pressure to said chamber whereby a pressure applied to the piston in said chamber causes deformation of the bar in a clearly defined manner; a sealing ring for sealing said piston with respect to said pressure-receiving chamber, said sealing ring having an inner peripheral edge secured in said piston and a radially outer peripheral edge held in said carrier means, said sealing ring further having a region formed by a weakened portion between its radially inward and radially outward peripheral edges, to permit movement of said piston in said chamber.

22. A device according to claim 21 wherein said sealing ring comprises a material with a substantially lower modulus of elasticity than the material of said piston and said carrier means.

23. A device according to claim 22 wherein said sealing ring material is silicone rubber.

24. A pressure measuring device for the mechanical-electrical measurement of pressure, comprising: a carrier means defining an opening therein, the carrier means providing a pressure-receiving chamber adapted to receive a pressure to be measured; a one piece deformable bar having first and second ends detachably secured to the carrier means and extending across said opening in the carrier means, the bar having weakened portions at a plurality of spaced positions therealong intermediate its ends, for a definite deformation of the bar of predetermined shape, said weakened portions each extending over the full width of the bar; strain gage means disposed on said weakened portions on the bar, operable to convert deformation of the bar to an electrical signal; a rigid piston means sealingly displaceable in the pressure-receiving chamber and engaging the bar substantially centrally thereof; and means for conducting a said pressure to said chamber whereby a pressure applied to the piston in said chamber causes deformation of the bar in a clearly defined manner, substantially all components of said device being comprised of the same material.

25. A device according to claim 24 wherein said material is aluminium.

26. A pressure measuring device for the mechanical-electrical measurement of pressure, comprising: a carrier means defining an opening therein, the carrier means providing a pressure-receiving chamber adapted to receive a pressure to be measured; a deformable bar having first and second ends secured to the carrier means and extending across said opening in the carrier means, the bar having weakened portions at four spaced positions therealong intermediate it ends, for defining the manner of deformation of the bar; transducer means on the bar, operable to convert deformation of the bar to an electrical signal; a rigid piston means sealingly displaceable in the pressure-receiving chamber and engaging the bar substantially centrally thereof; means for conducting a said pressure to said chamber whereby a pressure applied to the piston in said chamber causes deformation of the bar in a clearly defined manner; and first and second clamping means secured to said carrier means for clamping said first and second ends of said bar, each of said clamping means being stressed with respect to said carrier means in order thereby to clamp said bar across said opening and having a generally U-shaped cross-section defining first and second substantially parallel limb portions between which an associated end of said bar is clamped, and a transverse base portion secured to said carrier means.

27. A pressure measuring device for the mechanical-electrical measurement of pressure, comprising: a carrier means defining an opening therein, the carrier means providing a pressure-receiving chamber adapted to receive a pressure to be measured; a deformable bar having first and second ends secured to the carrier means and extending across said opening in the carrier means, the bar having weakened portions at four spaced positions therealong intermediate its ends, for defining the manner of deformation of the bar; transducer means on the bar, operable to convert deformation of the bar to an electrical signal; a rigid piston means sealingly displaceable in the pressure-receiving chamber and engaging the bar substantially centrally thereof; means for conducting a said pressure to said chamber whereby a pressure applied to the piston in said chamber causes deformation of the bar in a clearly defined manner; and first and second clamping means secured to said carrier means for clamping said first and second ends of said bar, each of said clamping means having a generally concave radially outward surface configuration, which thereby lies against an inward peripheral surface of the carrier means, and a screw extending through said carrier means in a radially inward direction and screwing into said clamping means thereby to secure said clamping means to said carrier means and also to cause said clamping means to clamp the respective end of said bar.

* * * * *